US009443485B2

(12) United States Patent
den Boer

(10) Patent No.: US 9,443,485 B2
(45) **Date of Patent: *Sep. 13, 2016**

(54) THIN-FILM TRANSISTOR LIQUID-CRYSTAL DISPLAY WITH VARIABLE FRAME FREQUENCY

(71) Applicant: Apple Inc., Cupertino, CA (US)

(72) Inventor: Willem den Boer, Brighton, MI (US)

(73) Assignee: Apple Inc., Cupertino, CA (US)

( * ) Notice: Subject to any disclaimer, the term of this patent is extended or adjusted under 35 U.S.C. 154(b) by 225 days.

This patent is subject to a terminal disclaimer.

(21) Appl. No.: 14/271,034

(22) Filed: May 6, 2014

(65) Prior Publication Data

US 2014/0240268 A1 Aug. 28, 2014

Related U.S. Application Data

(63) Continuation-in-part of application No. 13/270,140, filed on Oct. 10, 2011, now Pat. No. 8,730,226.

(60) Provisional application No. 61/410,305, filed on Nov. 4, 2010.

(51) Int. Cl.

| | |
|---|---|
| ***G06F 3/041*** | (2006.01) |
| ***G09G 3/36*** | (2006.01) |
| ***G06F 1/32*** | (2006.01) |

(52) U.S. Cl.

CPC ........... *G09G 3/3655* (2013.01); *G06F 1/3262* (2013.01); *G06F 1/3265* (2013.01); *G09G 3/3648* (2013.01); *G06F 3/0416* (2013.01); *G09G 2300/0456* (2013.01); *G09G 2300/0478* (2013.01); *G09G 2300/0861* (2013.01); *G09G 2300/0876* (2013.01); *G09G 2320/103* (2013.01); *G09G 2330/021* (2013.01); *G09G 2330/023* (2013.01); *G09G 2340/0435* (2013.01); *Y02B 60/1242* (2013.01)

(58) Field of Classification Search

None

See application file for complete search history.

(56) References Cited

U.S. PATENT DOCUMENTS

| | | | | |
|---|---|---|---|---|
| 5,661,531 A | 8/1997 | Greene et al. | | |
| 7,075,601 B2 | 7/2006 | Hong et al. | | |
| 7,112,355 B2 * | 9/2006 | Ohe | .................. | C09K 19/3003 252/299.01 |

(Continued)

FOREIGN PATENT DOCUMENTS

| | | |
|---|---|---|
| CN | 102967974 | 3/2013 |
| EP | 1239323 | 9/2002 |
| WO | 2014005395 | 1/2014 |

OTHER PUBLICATIONS den Boer, Willem, "A Pixel Design for TFT LCD's with Variable Refresh Rates," SID Symposium Digest of Technical Papers, Jun. 2011, vol. 42, Issue 1, pp. 373-376, 4 pages.

(Continued)

*Primary Examiner* — Andrew Sasinowski
*Assistant Examiner* — Henok Heyi
(74) *Attorney, Agent, or Firm* — Kendall P. Woodruff

(57) ABSTRACT

An active matrix includes an array of pixels individually addressable over a first frame-frequency range and over a second, higher frame-frequency range. The active matrix also includes, for each pixel of the array, a charging circuit through which that pixel is addressed. Each charging circuit includes an adjustable storage capacitance and is configured such that the storage capacitance is maintained at a first level over the first frame-frequency range, and at a second, lower level over the second frame-frequency range.

20 Claims, 13 Drawing Sheets

(56) References Cited

U.S. PATENT DOCUMENTS

| | | | | |
|---|---|---|---|---|
| 7,365,297 | B2 | 4/2008 | Kawai et al. | |
| 2002/0033804 | A1 | 3/2002 | Liang et al. | |
| 2002/0063669 | A1 | 5/2002 | Yanagi et al. | |
| 2003/0090478 | A1 | 5/2003 | McKnight | |
| 2006/0001634 | A1 | 1/2006 | Lee et al. | |
| 2007/0257259 | A1* | 11/2007 | Chen .................... | G09G 3/3648 257/59 |
| 2008/0129908 | A1 | 6/2008 | Nomura et al. | |
| 2008/0284929 | A1 | 11/2008 | Kimura | |
| 2010/0096988 | A1 | 4/2010 | Kitabayashi et al. | |
| 2010/0321353 | A1* | 12/2010 | Bae ...................... | G09G 3/3614 345/205 |
| 2011/0057917 | A1 | 3/2011 | Ryu et al. | |
| 2012/0113080 | A1 | 5/2012 | den Boer | |

OTHER PUBLICATIONS

Shishido, Hideaki et al., “High Aperture Ratio LCD Display using In—Ga—Zn—Oxide TFTs without Storage Capacitor,” SID Symposium Digest of Technical Papers, May 2010, vol. 41, Issue 1, pp. 1128-1131, 4 pages.

Amano, Seiko et al., “Low Power LC Display Using In—Ga—Zn—Oxide TFTs Based on Variable Frame Frequency,” SID Symposium Digest of Technical Papers, May 2010, vol. 41, Issue 1, pp. 626-629, 4 pages.

Huang, Yi et al., “The Ion Adsorption on SiOx Alignment Film Used for the Low Power LCDs Using Variable Frame Frequency,” SID Symposium Digest of Technical Papers, Jun. 2011, vol. 42, Issue 1, pp. 1633-1636, 4 pages.

* cited by examiner

THIN-FILM TRANSISTOR LIQUID-CRYSTAL DISPLAY WITH VARIABLE FRAME FREQUENCY

CROSS REFERENCE TO RELATED APPLICATIONS

This application is a continuation-in-part of U.S. patent application Ser. No. 13/270,140, filed Oct. 10, 2011 and entitled THIN-FILM TRANSISTOR LIQUID-CRYSTAL DISPLAY WITH VARIABLE FRAME FREQUENCY, which claims priority to U.S. Provisional Application 61/410,305, filed Nov. 4, 2010 and entitled PIXEL DESIGN FOR THIN FILM TRANSISTOR LIQUID CRYSTAL DISPLAYS WITH VARIABLE REFRESH RATE, the entirety of both of which are hereby incorporated by reference herein for all purposes.

TECHNICAL FIELD

This application relates to the field of digital display electronics, and more particularly, to reducing power consumption in a liquid-crystal display (LCD).

BACKGROUND

Low power consumption is desirable for any LCD—especially one installed in a mobile device such as a notebook computer or smart phone. In these devices, power consumption in the LCD significantly affects battery life.

In a conventional LCD array, each column of pixels is accessed through a data line. The capacitance of the data line is repeatedly charged and discharged at a frequency of $N_{select}$ times the frame frequency, where $N_{select}$ is the number of rows of the array. A frame frequency of 60 Hertz (Hz) is conventionally used to display video. For static images, however, a much lower frame frequency would suffice, the lower frame frequency demanding less frequent capacitive charging and therefore consuming less power.

To operate a conventional pixel array at a reduced frame frequency, however, the leakage current through each pixel and associated thin-film transistor (TFT) must be suppressed so that the image is retained over a longer period between successive refresh events. It has been demonstrated that obliquely evaporated $SiO_x$ liquid-crystal alignment layers, having increased ionic impurity adsorption, may improve voltage holding in an LCD array. This feature may enable the pixels of the display to operate at refresh frequencies as low as 1 Hz. TFT $I_{off}$ may be reduced to less than 10 femtoamperes (fA) in a recently developed, optimized oxide TFT. In addition, a TFT engineered with an especially narrow channel (low in width-to-length ratio) may exhibit attractively low $I_{off}$.

To display video, however, $I_{on}$ must remain high enough to charge the pixels at the conventional frame frequency (e.g., 60 Hz). All told, this would require an $I_{on}/I_{off}$ ratio of at least eight orders of magnitude. In a manufacturing environment, such a ratio may be difficult to achieve, especially when photo-leakage current in the TFT is taken into account.

SUMMARY

Accordingly, one embodiment of this disclosure provides an active matrix including an array of pixels individually addressable over a first frame-frequency range and over a second, higher frame-frequency range. The active matrix also includes, for each pixel of the array, a charging circuit through which that pixel is addressed. Each charging circuit includes an adjustable storage capacitance and is configured such that the storage capacitance is maintained at a first level over the first frame-frequency range, and at a second, lower level over the second frame-frequency range.

DETAILED DESCRIPTION

Figure 2:
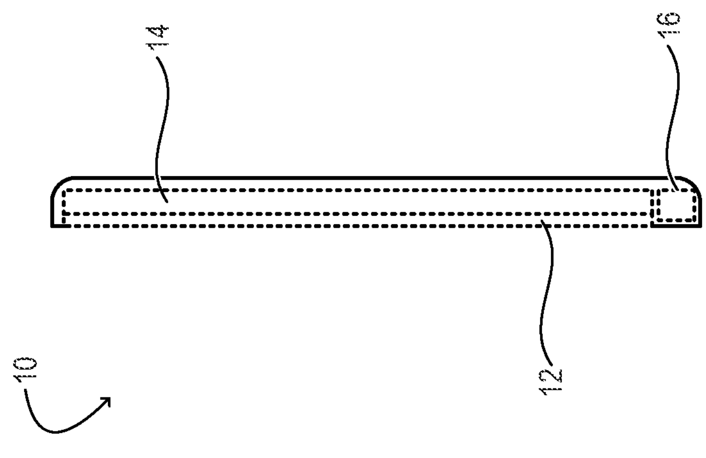
FIGS. 1 and 2 show a mobile device in accordance with an embodiment of this disclosure.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are simplified for clearer understanding and generally not drawn to scale. Rather, the various drawing scales, aspect ratios, and numbers of components shown in the figures may be purposely distorted to make certain features or relationships easier to see.

Figure 1:
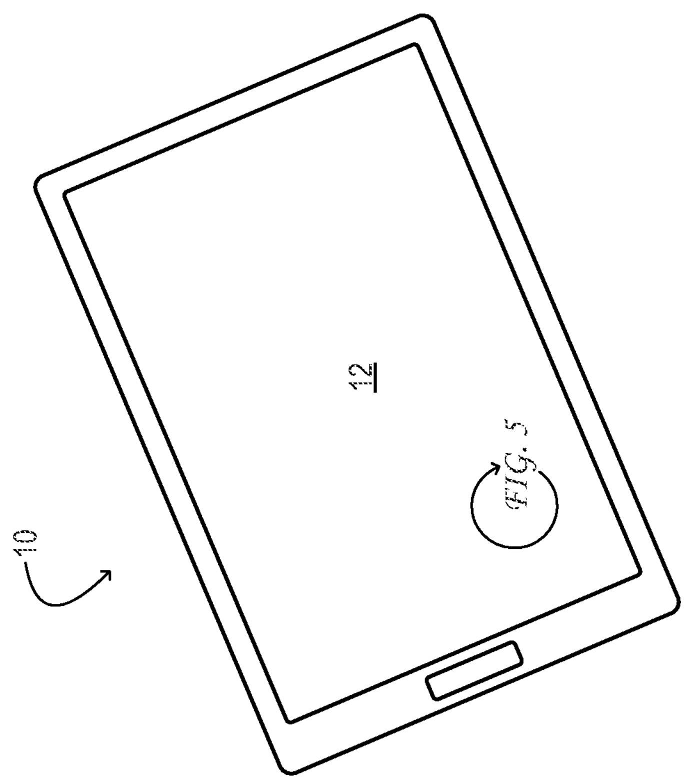

FIGS. 1 and 2 show, respectively, front and side views of an example mobile device 10. The mobile device may be a tablet computer, a personal media player, an e-book, or a smart phone, for example. The mobile device may be configured to display video, still graphics, text, and/or other image data. To this end, the device includes LCD array 12 disposed in front of backlight 14. The LCD array and backlight are operatively coupled to controller 16, which provides appropriate electronic control signals to enable the desired image data to be displayed. In some embodiments, the controller may be a microcomputer having memory, one or more processors, networking componentry, and the like.

Figure 3:
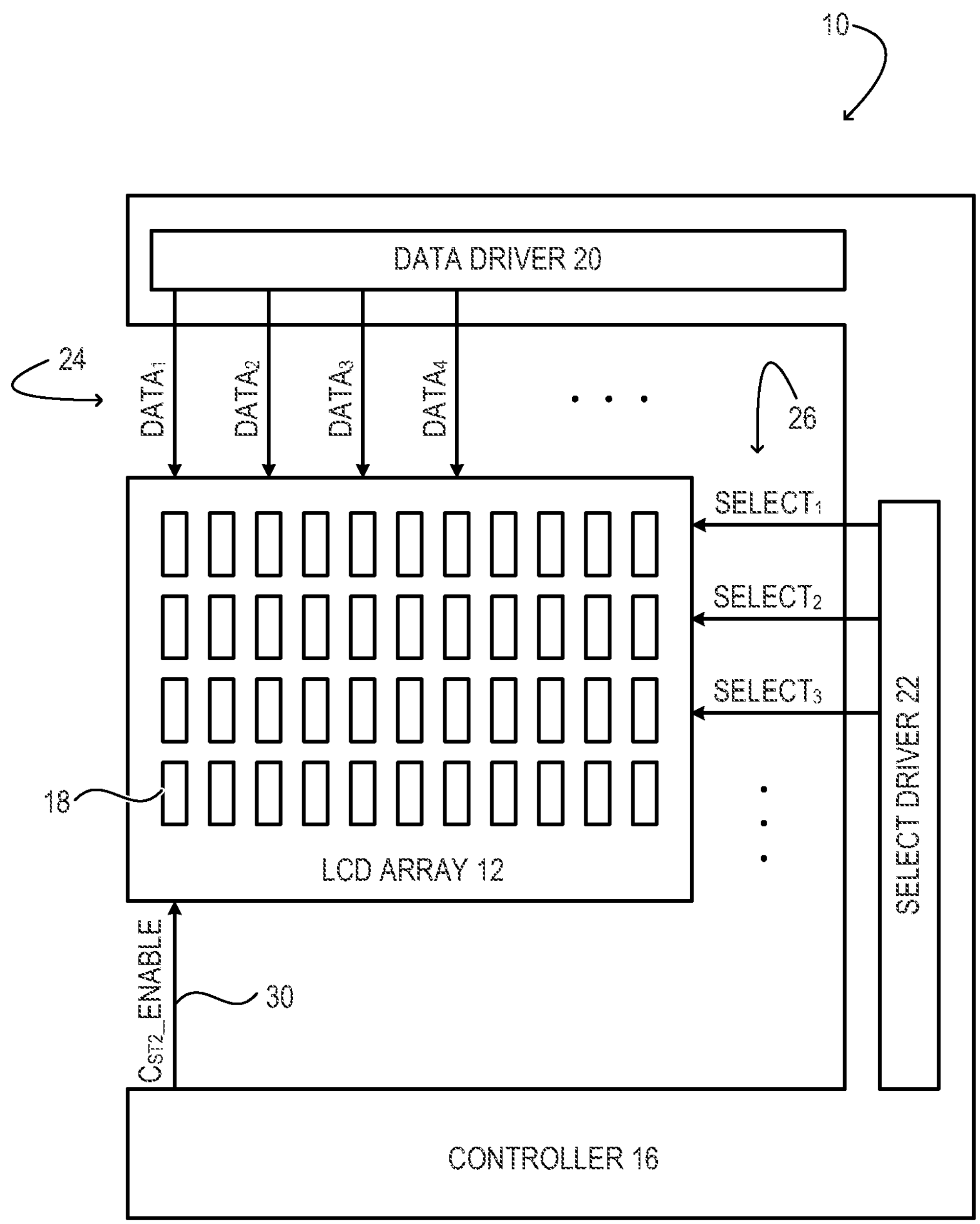
FIG. 3 shows an LCD array and controller in accordance with an embodiment of this disclosure.

FIG. 3 schematically shows LCD array 12 and controller 16 in greater detail. In the illustrated embodiment, the LCD array is an active matrix comprising individually addressable color pixels 18. The controller includes suitable drive componentry configured to individually address each pixel of the array. In various embodiments, the drive componentry may be configured to address the pixels at a switchable, or otherwise variable, frame frequency. In the embodiment of FIG. 3, the drive componentry includes data driver 20 and select driver 22. As shown in FIG. 3 and described in further detail hereinafter, the data driver drives a plurality of data lines 24 coupled each to a corresponding column of the LCD array. The select driver drives a plurality of select lines 26 coupled each to a corresponding row of the LCD array.

Table 1 lists example operating parameters for a seven-inch, normally white, twisted-nematic, backlit LCD panel in which each pixel is addressed through a TFT.

TABLE 1

Display parameters for an example backlit LCD

| Parameter | Value |
|---|---|
| Diagonal size | 7 inches |
| Resolution | svga, 800 (rgb) × 600 |
| Pixel aperture ratio | 48.2% |
| Display luminance | 296 nits |
| Cell transmittance | 5.68% |
| Total power consumption | 1515 milliwatts (mW) for black screen |
| Pixel capacitance | 0.095 picofarads (pF) |
| Data voltage swing | 0-10 volts |
| Drive method | dot inversion |
| Frame frequency (frame frequency) | 60 Hz |
| Data line capacitance | 45 pF |

Figure 4:
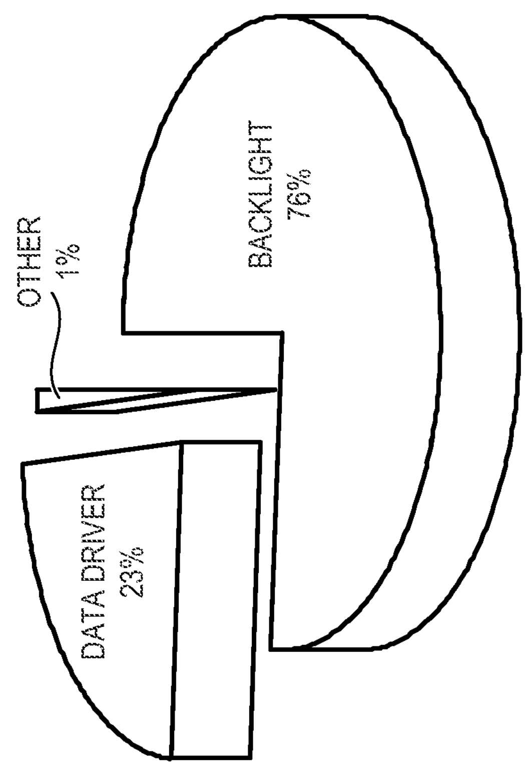
FIG. 4 summarizes power consumption for an example LCD array.

FIG. 4 summarizes power consumption for the system of Table 1; it shows that the data driver consumes 343 mW—i.e., 23% of the total power under black-screen conditions. In an LCD having no backlight—e.g., a reflective or transparent LCD—the data driver may be the largest power consumer.

Most of the power supplied to the data driver is dissipated in charging the data lines—viz., $$P_{datalines} = \frac{fC_{datalines}V^2}{2}, \tag{1}$$

where $C_{datalines}$ is the combined capacitance of the data lines (108 nanofarads (nf) for 2400 data lines in this example), f is the data-line frequency (the frame frequency times number of select lines, 36 kHz in this example), and V is the voltage swing on the data lines. As shown above, $P_{datalines}$ is proportional to the frame frequency. The power dissipated within the data driver itself is also approximately proportional to the frame frequency. Accordingly, power consumption in the LCD can be reduced significantly by lowering the frame frequency. In particular, a lower frame frequency of 1 to 6 Hz, for example, may be used to maintain a static image, reducing power consumption in the data driver by a factor of ten or more. For video, text entry, updates after touch events, scrolling, etc., the frame frequency may be restored automatically to a higher rate. In this manner, the frame-rate reduction may go unnoticed by the user.

To obtain an accurate, uniform gray scale and prevent flicker, an alternating-current (AC) square wave with data-voltage amplitude and with little or no direct-current (DC) offset should be applied to each pixel. To this end, a TFT charges each pixel to the appropriate data voltage and is subsequently switched off, so that the pixel electrode and TFT drain are left floating. To maintain an AC square wave on each pixel, the voltage holding ratio (VHR in equation 2) should be close to 100%.

$$VHR = 100\% \times \left(1 - \frac{0.5 \times I_{leak} \times t_{frame}}{C_{st} + C_{LC}}\right). \tag{2}$$

In equation 2, $t_{frame}$ is the frame time (the inverse of the frame frequency), $I_{leak}$ is the leakage current associated with the pixel, $C_{LC}$ is the capacitance of the pixel itself (i.e., the sandwich structure formed by two transparent electrodes and a liquid crystal between them), and $C_{st}$ is the storage capacitance arranged parallel to the pixel. The leakage current is the sum of several components—viz., $$I_{leak} = I_{offTFT} + I_{leakLC} + I_{leakCst}, \tag{3}$$

where $I_{offTFT}$ is the off current of the associated TFT, $I_{leakLC}$ is the leakage current through the pixel itself, and $I_{leakCst}$ is the leakage current through the $C_{st}$ capacitance. For high-quality dielectrics, $I_{leakCst}$ is being assumed to be negligible compared to the leakage currents $I_{offTFT}$ and $I_{leakLC}$.

Based on equation 2, a large $C_{st}$ is desirable at low frame frequencies (long $t_{frame}$) to optimize the voltage holding ratio. A large $C_{st}$ would make it difficult, however, for a TFT to charge a pixel to the required data voltage at a conventional (e.g., 60 Hz) frame frequency. Accordingly, $C_{st}$ is made variable in the embodiments disclosed herein—a larger capacitance being provided at low frame frequencies and a smaller capacitance at higher frame frequencies.

Figure 5:
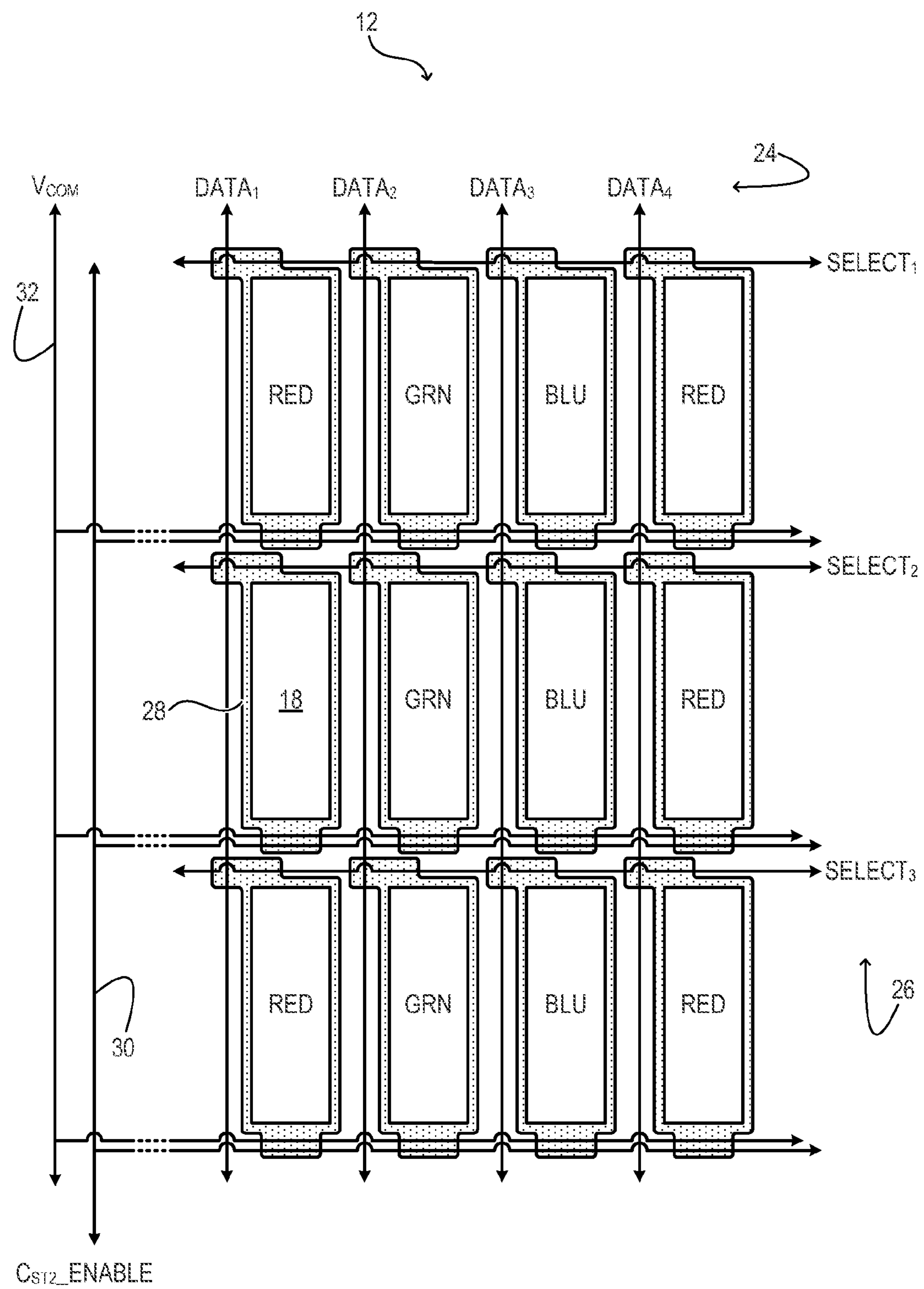
FIG. 5 shows an LCD array in greater detail in accordance with an embodiment of this disclosure.

FIG. 5 schematically shows an embodiment of LCD array 12 in greater detail. Associated with each pixel 18 of the array is a corresponding charging circuit 28, through which that pixel is addressed. To address the pixels, a data line 24 is connected to each charging circuit of every column of pixels; a select line 26 is connected to each charging circuit of every row of pixels. In addition to the data and select lines, capacitance-control line 30 ($C_{st2}$_ENABLE) and common-voltage line 32 ($V_{com}$) are connected to each charging circuit.

Figure 6:
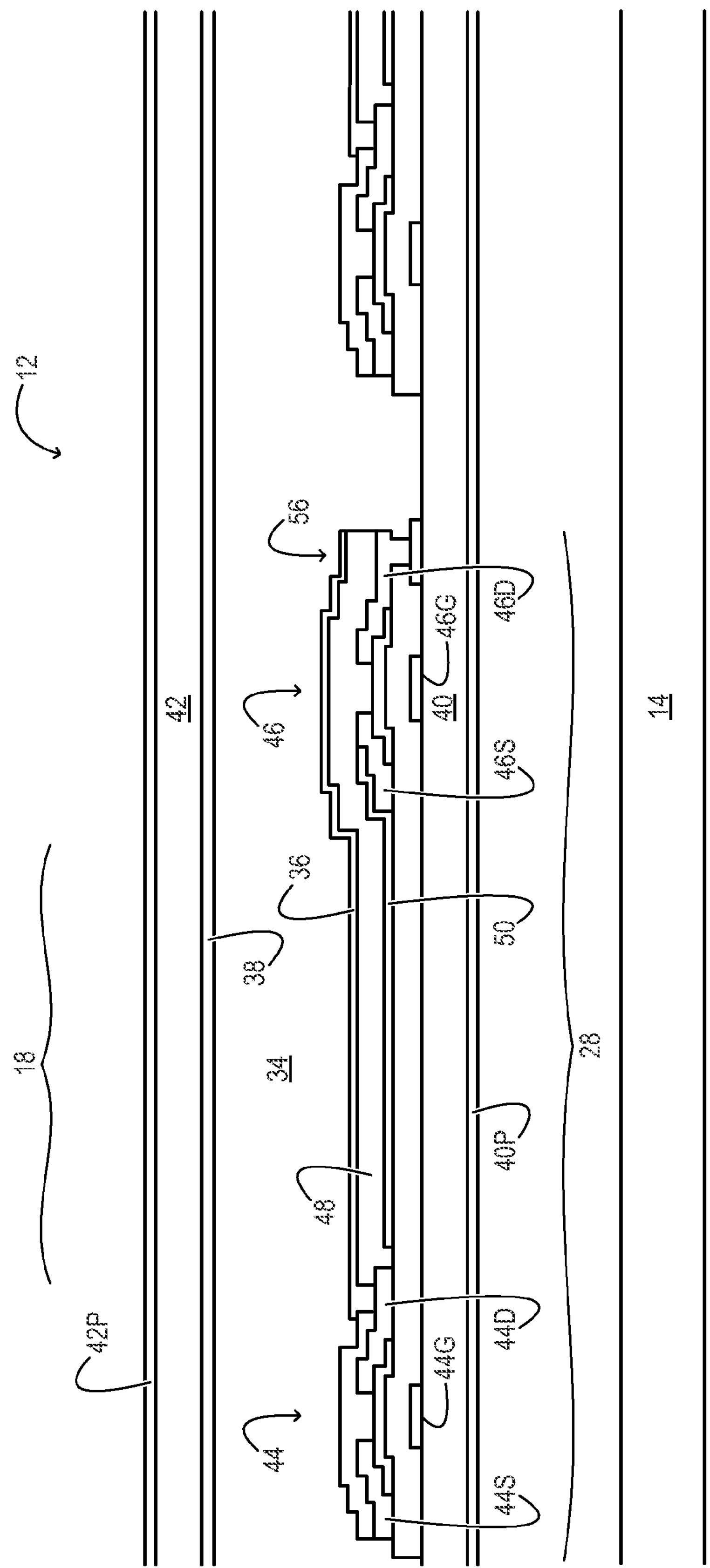
FIG. 6 shows a cross section of a pixel and a charging circuit in accordance with an embodiment of this disclosure.
Figure 7:
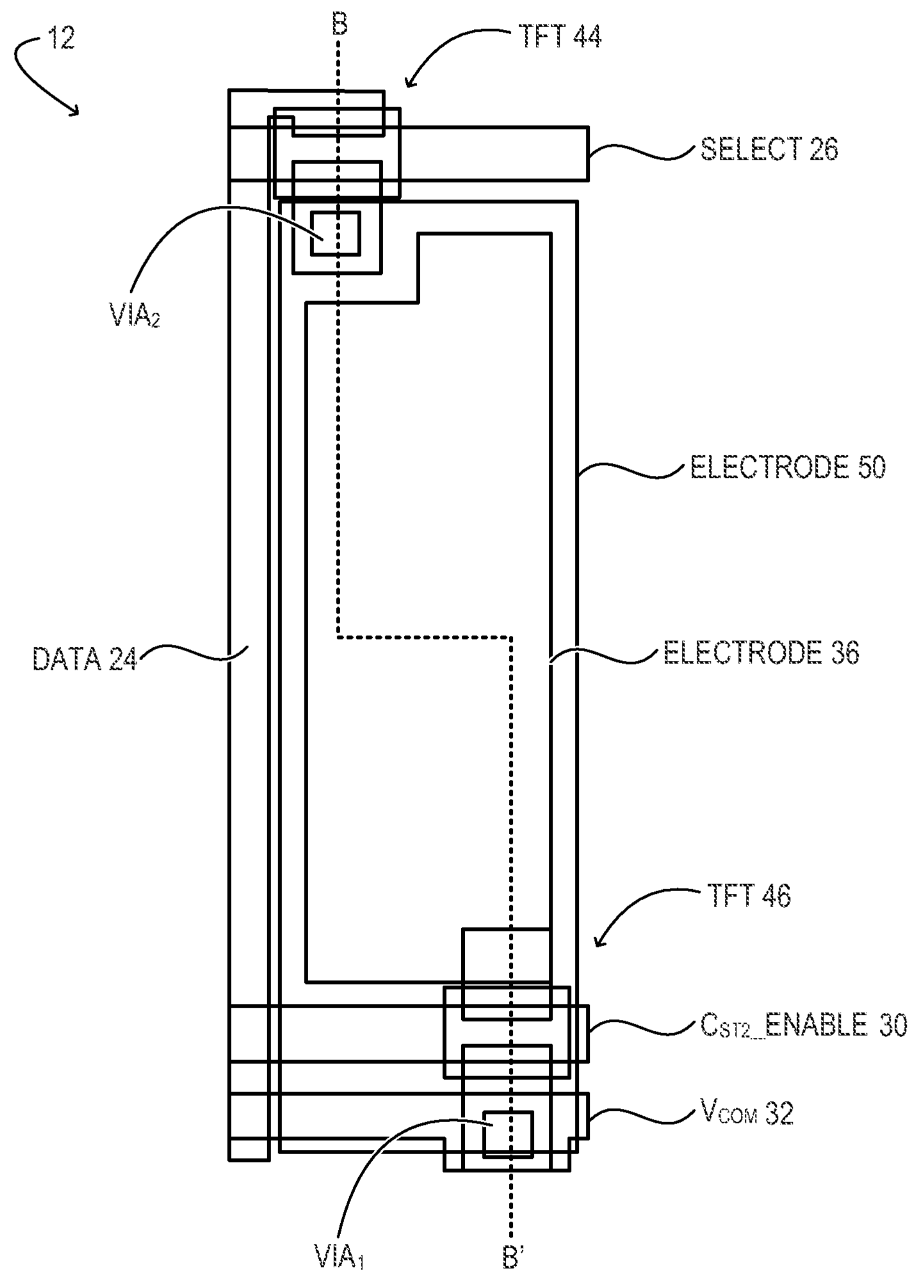
FIG. 7 shows in plan a pixel and charging circuit in accordance with an embodiment of this disclosure.
Figure 8:
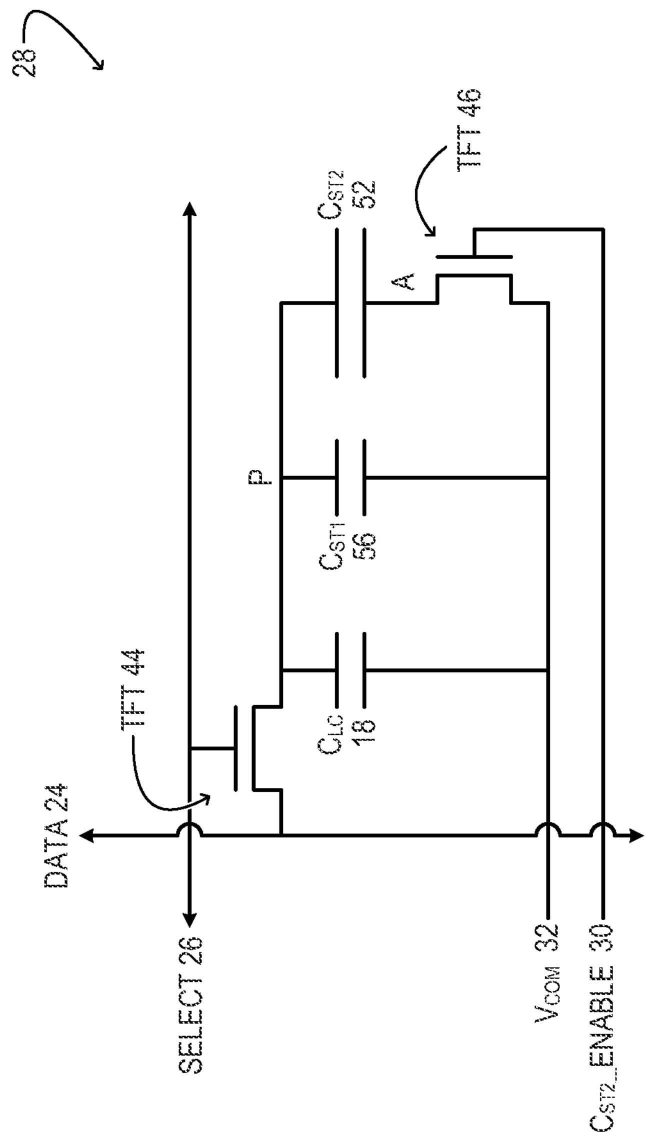
FIG. 8 schematically shows a charging circuit in accordance with an embodiment of this disclosure.

Example pixel 18 and charging circuit 28 are shown in cross section in FIG. 6, in plan in FIG. 7, and illustrated schematically in FIG. 8. It will be noted, however, that the particular circuits and structures shown here in no way limit the scope of this disclosure, as other circuits and structures may be used to the same or similar ends. For instance, while the description herein makes reference to the twisted-nematic (TN) mode of liquid-crystal display, the present disclosure is equally compatible with vertical-alignment (VA) and in-plane switching (IPS) modes.

In FIG. 6, each pixel 18 includes liquid-crystal 34 sandwiched between transparent pixel electrode 36 and transparent shared electrode 38. The liquid crystal may be of any variant suitable for display applications; it may comprise a TN liquid crystal material in one embodiment. The shared electrode and the pixel electrode may each comprise any suitable, optically transparent conductor, such as indium tin oxide (ITO). The pixel electrodes of LCD array 12 are isolated from each other, while the shared electrode extends over a plurality of pixels.

Continuing in FIG. 6, pixel electrode 36 and various components of charging circuit 28 are arranged on a first glass sheet 40, which faces backlight 14 and receives light therefrom. Shared electrode 38 is formed on a second glass sheet 42 aligned parallel to the first. In the illustrated embodiment, the first glass sheet supports a first polarizing filter 40P, and the second glass sheet supports a second polarizing filter 42P. The polarization planes of the two filters may be aligned orthogonally to effect a 'normally white' display, in which pixel 18 is maximally transmissive (in TN mode) with the pixel and shared electrodes unbiased. In this embodiment, transmittance in the unbiased state is due to a ninety-degree rotation of the light as it traverses liquid crystal 34. Voltage applied between the shared electrode and the pixel electrode disrupts the alignment of the liquid crystal, effecting less rotation of the light, thereby reducing transmittance through the pixel.

As shown in the drawings, each charging circuit 28 includes a pixel-selecting transistor 44 having a source 44S, a drain 44D, and a gate 44G. The source of the pixel-selecting transistor is connected to data line 24, the drain is connected to pixel electrode 36, and the gate is connected to select line 26. Each charging circuit also includes a capacitance-control transistor 46 having a source 46S, a drain 46D, and a gate 46G, as further described hereinafter. In one embodiment, both the pixel-selecting transistor and the capacitance-control transistor are amorphous-silicon (a-Si), TFTs. The illustrated TFT configuration can be manufactured using five to seven mask steps.

In the illustrated embodiment, dielectric 48 is sandwiched between pixel electrode 36 and a transparent auxiliary electrode 50 to form an auxiliary capacitor 52. Like pixel electrode 36 and shared electrode 38, auxiliary electrode 50 may also comprise ITO. For embodiments in which an oxide TFT backplane is used with IGZO (indium gallium zinc oxide) TFTs, the number of process steps used to form the TFTs may be reduced by using IGZO as one of the transparent conductors. For example, IGZO may be deposited during a step in which the active semiconductor layer of the TFT and transparent electrode are deposited. While IGZO in a TFT is a semiconductor with high resistivity, IGZO at the transparent electrode location can be converted into a conductive layer via exposure to a plasma (e.g., of $H_2$ or He).

For embodiments in which a low temperature poly-silicon (LTPS) TFT LCD is formed, auxiliary capacitor 52 may be formed between a section of a poly-Si layer and gate metal, with a gate insulator interposed therebetween as a dielectric. The poly-Si layer may be made conductive via ion doping or ion implantation, for example. The gate dielectric may be $SiO_2$, for example, and may be relatively thin (e.g., 50 to 100 nm) so that the capacitance per unit area is high to achieve a high auxiliary capacitance. Such a configuration may mitigate an increase in the number of process steps used to form an LTPS backplane.

Alternatively, in an LTPS TFT LCD employing a relatively thick (e.g., about 3 μm) polymer interlevel dielectric to increase pixel aperture ratio, two transparent electrodes may be deposited and patterned on top of the polymer interlevel dielectric. The two transparent electrodes may be separated by a thin inorganic dielectric to create the auxiliary capacitance, and at least one of the transparent electrodes may overlap the buslines to maximize pixel aperture ratio.

In one embodiment, dielectric 48 may comprise the same material as the gate-insulation and/or passivation layer of the pixel-selecting and/or capacitance-control transistors. In other embodiments, the dielectric may comprise a different material—e.g., tantalum oxide—and it may be situated differently. For example, instead of being directly coupled to the pixel electrode, the dielectric may in some cases be coupled to an opaque conductor linked to the pixel electrode. Accordingly, the auxiliary electrode need not be transparent in every embodiment.

In the illustrated embodiment, source 46S of the capacitance-control transistor is connected to auxiliary electrode 38; drain 46D is connected to common-voltage line 32, which is also connected to shared electrode 38; and gate 46G is connected to capacitance-control line 30. Turning again to FIG. 6, charging circuit 28 also includes a permanent capacitor 56 connected in parallel to pixel 18. In the illustrated embodiment, the permanent capacitor is formed by drain 46D and the portion of pixel electrode 36 directly opposite the drain, with dielectric 48 sandwiched in between. In such embodiments, the size of auxiliary electrode 38 relative to drain 46D may be chosen such that the capacitance of auxiliary capacitor 52 is much greater than the combined capacitance of permanent capacitor 56 and pixel 18—i.e., $C_{st2} \gg C_{st1}+C_{LC}$. In other embodiments, a deliberately engineered permanent capacitance may be omitted, such that $C_{st1}$ can be negligible, or substantially zero.

With its permanent capacitor 56 and decoupleable auxiliary capacitor 52, charging circuit 28 provides, effectively, an adjustable storage capacitance, as shown schematically in FIG. 8. At the higher, conventional frame frequencies (e.g., 60 Hz), $C_{st2}$ may be disconnected from $V_{com}$ by keeping capacitance-control transistor 46 off, so that node A is allowed to float, and ultimately follows node P. Under these conditions, $C_{st2}$ is not charged when the pixel is updated. At the lower frame frequencies (e.g., 1 to 6 Hz), the capacitance-control TFT is switched on, connecting node A to $V_{com}$. The large capacitance of $C_{st2}$ ensures that during the long frame time at low frame frequencies, the root-mean-square (RMS) voltage drop at pixel node P is less than a gray level (5 to 10 mV), even for a liquid crystal and TFT with non-optimized leakage, provided that the $C_{st2}$ leakage is much lower. For static images, the higher capacitance may be used along with a low frame frequency, for decreased power consumption in the data driver. For dynamic images, including video, the lower capacitance may be used along with a higher frame frequency. To this end, controller 16 may include suitable capacitance-control componentry configured to maintain the storage capacitance of each charging circuit at a first level over a first frame-frequency range, and at a second, lower level over a second, higher frame-frequency range. Capacitance-control line 30 may be connected to such componentry.

The desired value of $C_{st2}$ depends on the lower frame frequency. For example, if the frame frequency for static images is 6 Hz, both the frame time and line-select time are increased tenfold relative to high frame-frequency conditions. The total pixel capacitance may be increased tenfold as well to maintain an RMS voltage drop less than the gray level during the hold time. Accordingly, $$C_{st2}=9\times(C_{st1}+C_{LC}) \qquad (4)$$

The small RMS voltage drop at low frame frequencies also eliminates flicker at 3 or 6 Hz. Here capacitance-control transistor 46 is ON, which may cause a threshold voltage shift in some types of TFTs (including a-Si TFTs). The threshold voltage shift can be minimized by balancing the on and off state of the capacitance-control transistor. In some embodiments, a negative bias may be left on the $C_{st2}$_ENABLE line when the display is not in use. In this and other embodiments, dot inversion driving may help to eliminate flicker at both high and low frame frequencies.

In the case of transreflective LCDs, the extra TFT for switching $C_{st2}$, as well as the extra control line, can be hidden under the reflective part of the pixel electrode. In LCDs with patterned photo spacers, the extra circuitry can also be routed under the photo spacer. $C_{st1}$ and $C_{st2}$ may also be connected to the next gate line, rather than to $V_{com}$. This eliminates the $V_{com}$ line in charging circuit 28 and improves the aperture ratio of the display. Another option is to replace the ITO-ITO storage capacitance described hereinabove with a small-area storage capacitance having a high dielectric constant, low leakage dielectric, such as tantalum oxide.

The circuit shown in FIG. 8 was investigated using a Simulation Program with Integrated Circuit Emphasis (SPICE). Pixel-selecting transistor 44 and capacitance-control transistor 46 were each modeled as an a-Si TFT with a mobility of 0.5 square centimeters per volt-second and a threshold voltage of 2.5 volts. Table 2 shows additional modeling parameters.

TABLE 2

Parameters for SPICE simulation of the circuit of FIG. 8

| | | |
|---|---|---|
| W/L | channel width/length both TFTs | 10/4 micrometers |
| $C_{LC}$ | LC capacitance | 0.2 pF |
| $R_{offTFT}$ | off (leakage) resistance of TFT | 1E+13 ohm |
| $R_{LC}$ | LC leakage resistance | 1E+13 ohm |
| $C_{st1}$ | permanent storage capacitance | 0.2 pF |
| $C_{st2}$ | auxiliary storage capacitance at 6 Hz | 3.6 pF |
| $V_{S\ high}$ | select on voltage | 20 V |
| $V_{S\ low}$ | select off voltage | −5 V |
| $V_{D\ high}$ | high data voltage | 8 V |
| $V_{D\ low}$ | low data voltage | 0 V |
| $V_{COM}$ | common-voltage line and color filter plate | ~4 V |
| $t_{frame}$ | frame time for 60 Hz/6 Hz frame frequency | 16.7/167 millisecond |
| $C_{st2}$__ ENABLE | voltage on $C_{st}$ control TFT for 60 Hz/6 Hz | −5 V/20 V |
| $N_{select}$ | number of select lines (pixel rows) | 600 |

Figure 9:
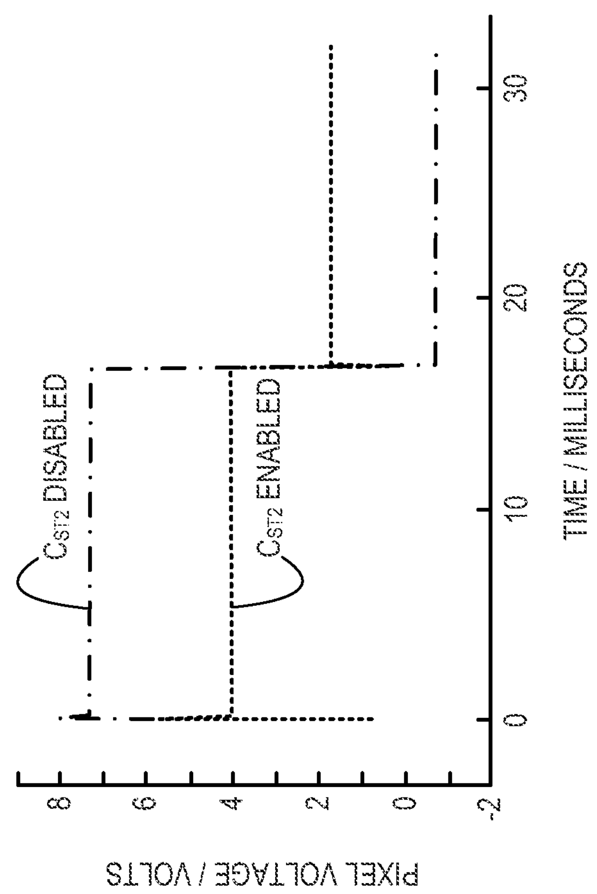
FIG. 9 shows a simulated voltage waveform at node P of FIG. 8 at a 60-Hz frame frequency, in accordance with an embodiment of this disclosure.
Figure 10:
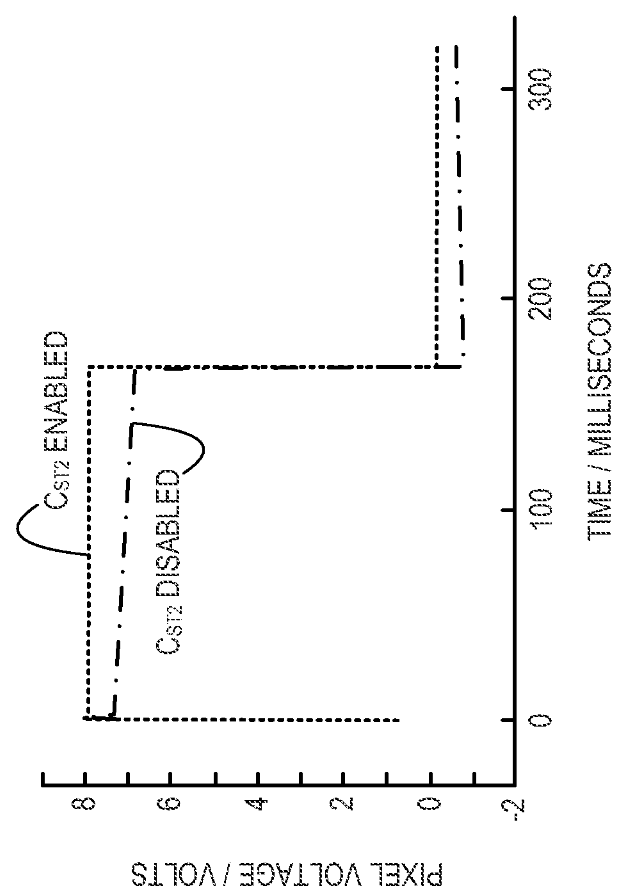
FIG. 10 shows a simulated voltage waveform at node P of FIG. 8 at a 6-Hz frame frequency, in accordance with an embodiment of this disclosure.

FIGS. 9 and 10 show results of the simulation for high and low frame frequencies, respectively. In both figures, the pixel voltage is plotted versus time for conditions in which $C_{st2}$ is enabled (dashed plot) and for conditions in which $C_{st2}$ is disabled (dot-dashed plot). The requirement of a square wave with data-voltage amplitude across the pixel is achieved at 60 Hz only when $C_{st2}$ is disabled and at 6 Hz only when $C_{st2}$ is enabled. With $C_{st2}$ enabled at 60 Hz, the access TFT cannot fully charge the pixel within the short line select time; with $C_{st2}$ disabled at 6 Hz, the RMS voltage on the pixel drops significantly during the long frame time due to the leakage in the transistor and the pixel. In addition, the pixel voltage shift after switching off the gate is ten times smaller when $C_{st2}$ is enabled than when $C_{st2}$ is disabled. Accordingly, $V_{com}$ may be adjusted when switching between modes to maintain a pure AC voltage with no DC component across the LC.

At high frame frequencies, the data-line capacitance is given by $$C_{loadhr}=C_{dataline}+C_{LC}+C_{st1}, \qquad (5)$$

and at low frame frequencies, the data-line capacitance is given by $$C_{loadhr}=C_{dataline}+C_{LC}+C_{st1}+C_{st2}. \qquad (6)$$

Since the data line capacitance, which is the sum of row-column crossover capacitances, gate-source capacitances, and pixel-to-data line capacitances of all pixels on one column (data line), is much larger than $C_{LC}$, $C_{st1}$ and $C_{st2}$ combined, there is less than 3% difference between $C_{loadhr}$ and $C_{loadlr}$ (see also Table 1). Therefore, power consumption in the data driver is substantially to proportional to frame frequency.

Figure 11:
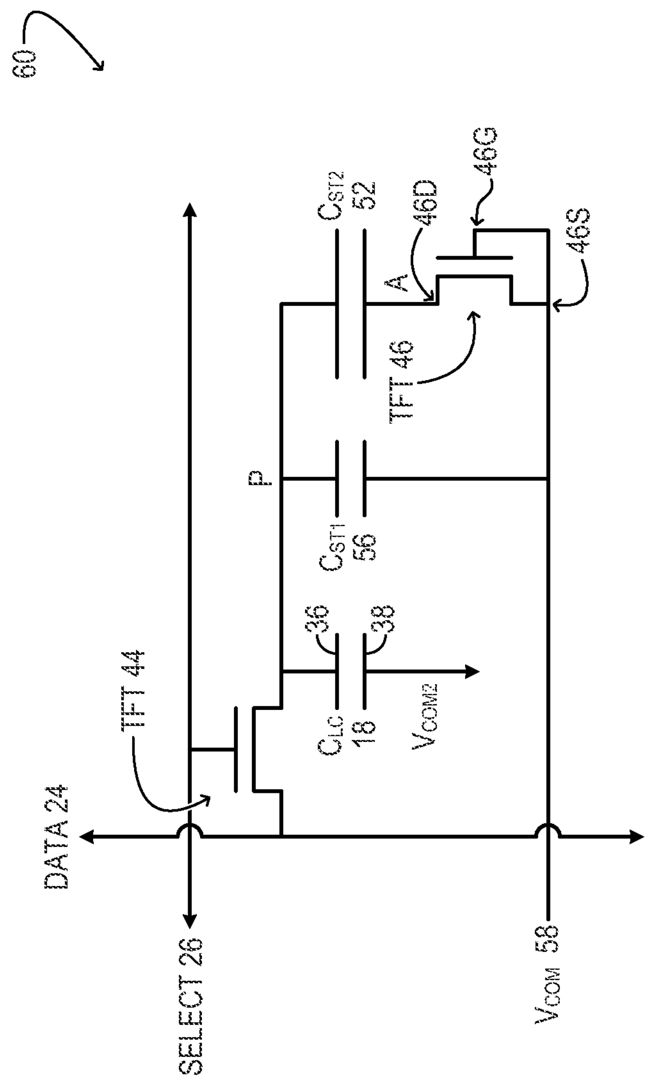
FIG. 11 schematically shows another charging circuit in accordance with an embodiment of this disclosure.

Charging circuit 28 may be modified in various suitable manners without departing from the scope of this disclosure. FIG. 11 shows an example of one such modification in which the capacitance-control line (e.g., 30 from FIG. 8) and the common-voltage line (e.g., 32 from FIG. 8) are combined into a single common-voltage line 58 to form a charging circuit 60. As depicted therein, a voltage $V_{com2}$ across pixel electrode 36 and shared electrode 38 may differ from $V_{com}$ on a TFT backplane. In addition to combining the capacitive-control line and the common-voltage line, the source and gate of the TFT controlling the auxiliary capacitance may be shorted—for example, source 46S and gate 46G of capacitance-control transistor 46 of FIG. 6 may be shorted. Charging circuit 60 may be particularly employed in a TN or VA display. A display employing charging circuit 60 may exhibit an increased pixel aperture ratio and luminance relative to one in which charging circuit 28 of FIG. 8 is employed. When a voltage $V_{com}$ on an a-Si TFT backplane is high, the control TFT may conduct and the auxiliary capacitance may be activated for the low frame frequency condition. When $V_{com}$ is low, the auxiliary capacitance may be deactivated for the high frame frequency condition.

Figure 12:
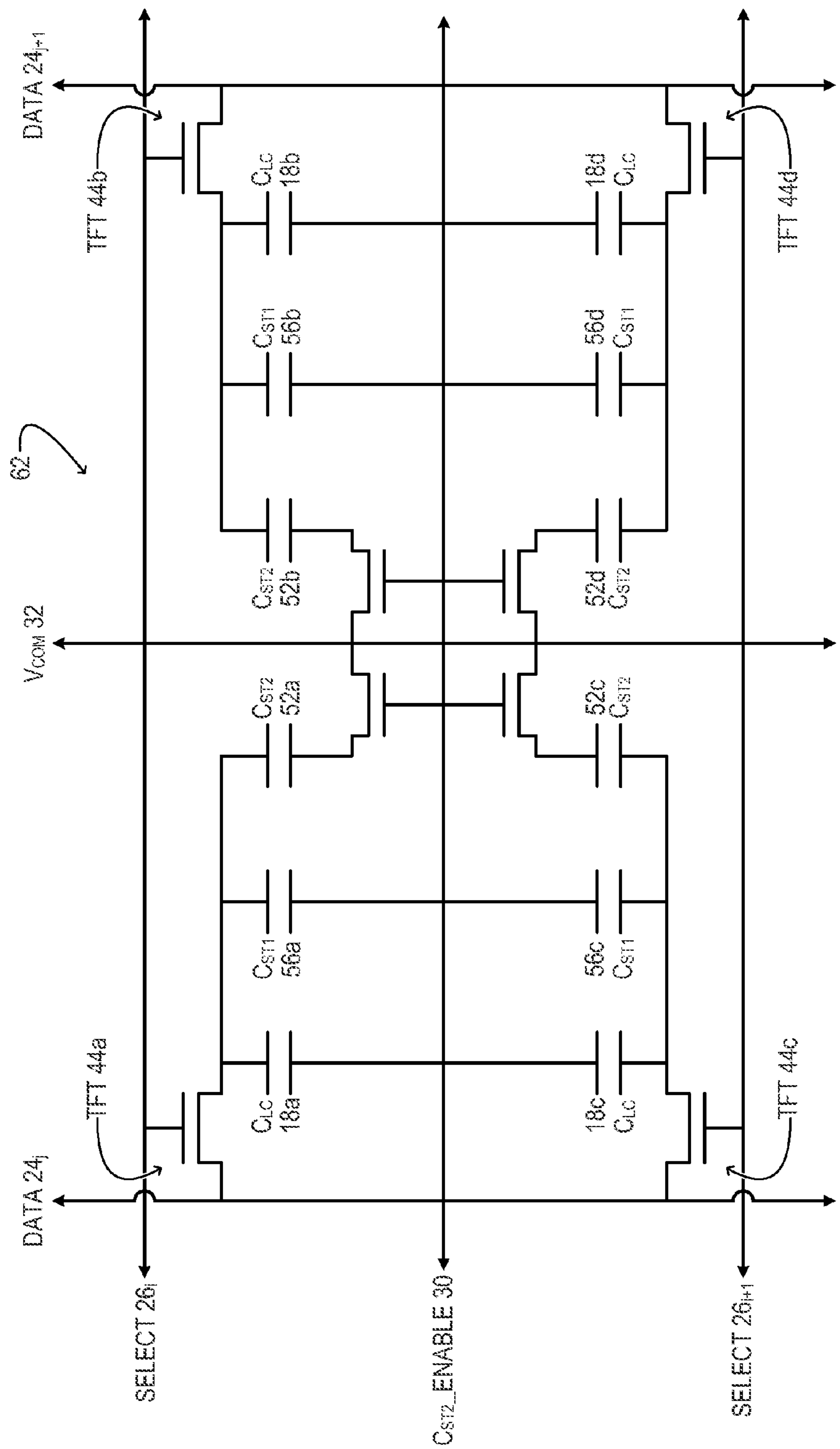
FIG. 12 schematically shows yet another charging circuit in accordance with an embodiment of this disclosure.

FIG. 12 schematically shows another charging circuit 62 in accordance with an embodiment of this disclosure. As shown therein, common-voltage line 32 and capacitance-control line 30 are shared between adjacent pixels. Here, common-voltage line 32 runs parallel to a plurality of data lines 24, two of which (labeled "$data_j$" and "$data_{j+1}$" are shown in FIG. 12, while capacitance-control line 30 runs parallel to a plurality of select lines 26. Relative to other configurations such as the one shown in FIG. 8, the number of common-voltage lines and capacitance-control lines are each reduced by a factor of two, increasing the aperture ratio and luminance of a display employing charging circuit 62. Charging circuit 62 may be used with a typical RGB color filter arrangement, or other arrangements such as an RGBW quad filter arrangement for increased optical efficiency. Such an arrangement may include groupings of four square subpixels, though other subpixel geometries and arrangements are possible without departing from the scope of this disclosure.

The configurations described above enable various methods for driving an active-matrix display. Accordingly, some such methods are now described, by way of example, with continued reference to the above configurations. It will be understood, however, that the methods here described, and others fully within the scope of this disclosure, may be enabled by other configurations as well.

Figure 13:
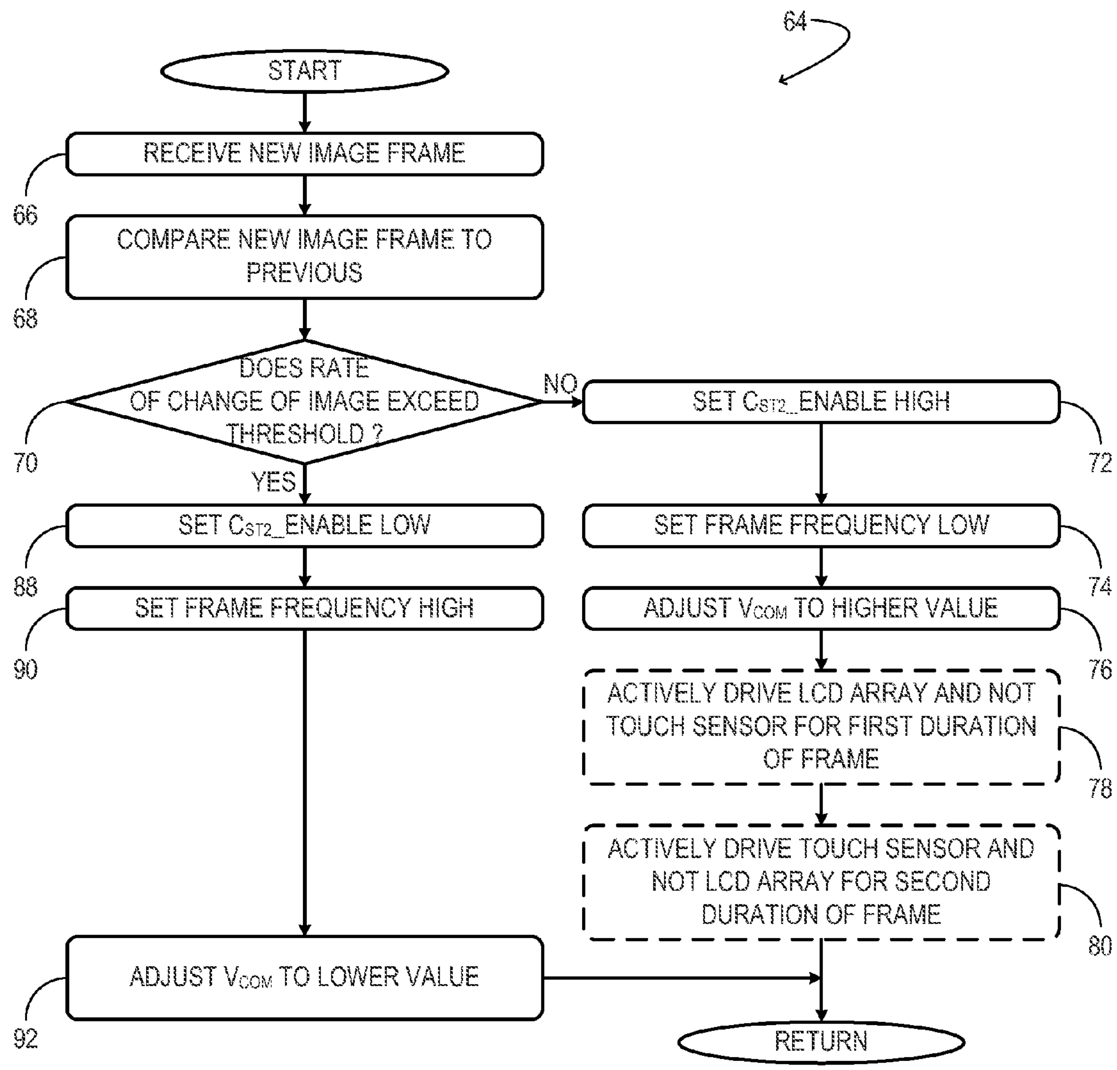
FIG. 13 illustrates an example method for driving an active-matrix display in accordance with an embodiment of this disclosure.

FIG. 13 illustrates an example method 64 for driving an active-matrix display, the display including an array of pixels individually addressable by drive componentry over a first frame-frequency range and over a second, higher frame-frequency range. As described hereinabove, a charging circuit with an adjustable storage capacitance is provided for each pixel of the display.

At 60 of method 64, a new image frame is received into one or more memory segments of a controller that provide a signal to the drive componentry of the LCD. At 68 the new image frame is compared to one or more previous image frames. At 70 it is determined whether the rate of change of the image exceeds a predetermined threshold. As further described below, the first and second frame-frequency ranges may be selected based on the rate of change of the image.

In one embodiment, the action at 70 may comprise determining how long the image remains unchanged. Here, the rate of change will vary inversely as the lifetime of the unchanged image. In another embodiment, the rate of change may be a binary value reflecting, simply, whether the current image frame exactly matches the previous image frame. The rate of change is zero if it does and one otherwise. In any case, if the rate of change does not exceed the predetermined threshold, then the method advances to 72; otherwise, the method advances to 88.

At 72 of method 64, the $C_{st2}$_ENABLE line is set to a high (e.g., positive) level, and at 74, a low frame frequency is selected. The low frame frequency may be selected from a first frame-frequency range, which includes frequencies of 1 to 7 Hz. The high level on the $C_{st2}$_ENABLE line causes the data line to charge the $C_{st2}$ capacitance every time the pixel is charged. Accordingly, the storage capacitance of each charging circuit is maintained at a first level over the first frame-frequency range. At 76, $V_{COM}$ is adjusted to a higher value to reduce the DC offset across each pixel at low frame frequencies.

Figure 14:
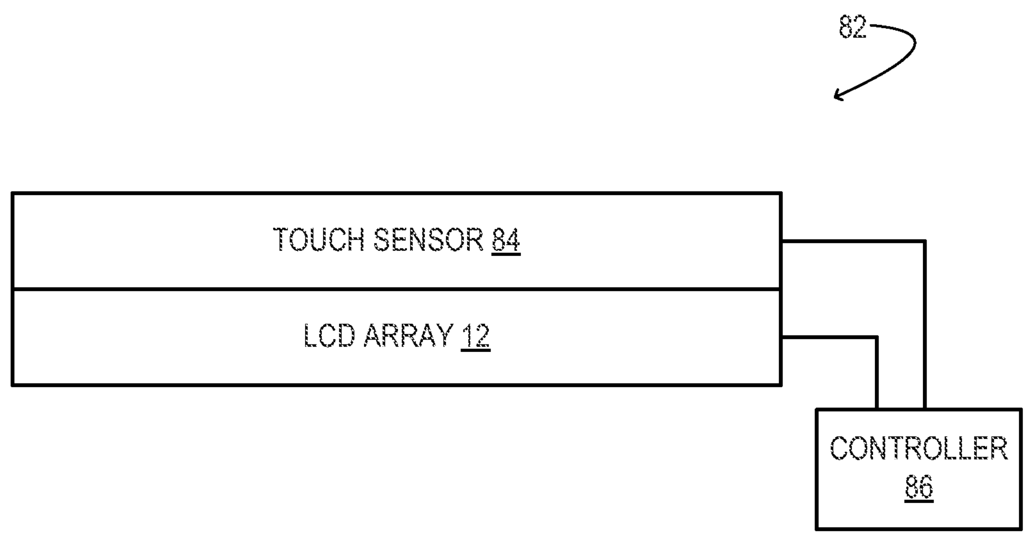
FIG. 14 schematically shows a combined LCD array/touch-sensing stack in accordance with an embodiment of this disclosure.

FIG. 13 shows optional steps 78 and 80 that may be performed for embodiments in which method 64 is used to drive a display that includes a touch sensor. More specifically, steps 78 and 80 may be employed to reduce noise in signals outputted from the touch sensor. Such noise may be caused by the driving of a proximate LCD array. Turning briefly to FIG. 14, a combined LCD array/touch-sensing stack 82 in accordance with an embodiment of this disclosure is shown. As depicted therein, a touch sensor 84 is positioned above LCD array 12 and configured to sense touch input applied to and/or proximate a surface of the combined stack. In some embodiments, touch sensor 84 comprises a plurality of conductive transmit and receive electrodes. Each of the transmit electrodes may be coupled to respective drive circuits, while each of the receive electrodes may be coupled to respective detect circuits such that the transmit electrodes may be selectively driven (e.g., successively) and currents and/or voltages resulting in the receive electrodes detected to sense touch input. Touch sensing in this manner may be facilitated by operating the drive and detect circuits via a controller 86, which is shown as also operating the LCD array, although respective controllers for the touch sensor and LCD array may be provided. Further, the combined stack may include other components not shown, including but not limited to a touch sheet positioned above the touch sensor and/or an optically clear adhesive (OCA).

For implementations in which touch sensor 84 and LCD array 12 are simultaneously driven to provide concurrent graphical output and touch sensing, high-frequency signals used to drive the LCD array may introduce noise to signals generated by the touch sensor, reducing the accuracy of touch sensing. Returning to FIG. 13, optional steps 78 and 80 of method 64 may be employed to mitigate these issues. At 78, the LCD array, and not the touch sensor, is actively driven for a first duration of a frame. Actively driving the LCD array may include, for example, supplying high-frequency signals to the LCD array. At 80, the touch sensor, and not the LCD array, is actively driven for a second duration of the frame, which may not overlap the first duration—for example, the second duration may be the remaining duration of the frame following the first duration. Actively driving the touch sensor may include, for example, driving the transmit electrodes of the touch sensor. Here, an increase in frame time due to the selection of a low frame frequency at 74 is leveraged to separate LCD array and touch sensor operation. For example, a reduction in frame frequency from 60 Hz to 6 Hz increases the frame time from 16.7 ms to 167 ms; 140 ms may be used to drive the LCD array while the remaining 27 ms may be used to drive the touch sensor. In this example, the first frame duration is greater than the second frame duration, though examples in which the second frame duration is greater than or equal to the first frame duration are contemplated as well. Operation separation in this manner may increase the performance of the touch sensor and facilitate the construction of larger and different display configurations (e.g., in-cell, on-cell, etc.) while maintaining sufficient touch sensitivity. The order may be switched so that the touch sensor is driven before the LCD array.

Step 88 of method 64 is reached when the rate of change of the image exceeds the predetermined threshold. At 88 the $C_{st2}$_ENABLE line is set to a low (e.g., negative) value, and at 90, a high frame frequency is selected. The high frame frequency may be selected from a second frame-frequency range, which includes frequencies of 50 to 70 Hz. In other embodiments, the second frame-frequency range may differ; it may include frequencies of 120 and/or 240 Hz, for example. The low level on the $C_{st2}$_ENABLE line prevents the data line from charging the $C_{st2}$ capacitance when the pixel is charged. Accordingly, the storage capacitance of each charging circuit is maintained at a second, lower level over the second frame-frequency range. At 92 $V_{COM}$ is adjusted to a lower value to reduce the DC offset across each pixel at high frame frequencies. From 80 or 92, method 64 returns.

In sum, the approach described herein enables an LCD with conventional-leakage TFT and LC components to operate at a variable frame frequency. By switching to the lower frame frequency during static-image display, the data driver consumes much less power. This technology is applicable in mobile devices ranging from smart phones to tablet PCs, as well as larger-format displays for internet television. In transreflective LCDs, which have room to route the extra circuitry under the reflective part of the pixel electrode, and which also may include a lower-power backlight, the variable load-capacitance design may offer an even greater reduction in power consumption. For transparent LCDs having no backlight at all, the energy savings may be greater still. In addition to numerous other applications, TFT LCDs for digital signage and e-books, which in typical operation exhibit would allow extended periods of low-refresh operation, are good candidates for implementing the strategies disclosed herein.

Finally, it will be understood that the articles, systems, and methods described hereinabove are embodiments of this disclosure—non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. An active-matrix display comprising:

an array of pixels;

drive componentry to individually address each pixel of the array at a variable frame frequency;

for each pixel of the array, a charging circuit through which that pixel is addressed, the charging circuit including an adjustable storage capacitance; and capacitance-control componentry including a capacitance-control transistor having a gate and a source, the gate and the source coupled to a common-voltage line, the capacitance-control componentry configured to maintain the storage capacitance of each charging circuit at a first level over a first frame-frequency range, and at a second, lower level over a second, higher frame-frequency range.

2. The display of claim 1, wherein each pixel includes a liquid-crystal sandwiched between a transparent pixel electrode and a transparent shared electrode.

3. The display of claim 2, wherein the liquid-crystal is a twisted-nematic liquid crystal.

4. The display of claim 2, wherein the liquid-crystal is a vertical-alignment liquid crystal.

5. The display of claim 2, wherein each charging circuit includes:

a pixel-selecting transistor having a drain connected to the pixel electrode; and an auxiliary capacitor including a dielectric and an auxiliary electrode, a drain of the capacitance-control transistor connected to the auxiliary electrode.

6. The display of claim 5, further comprising:

for each column of pixels, a data line connected to the charging circuit of each pixel of the column at a source of the pixel-selecting transistor of that pixel; and for each row of pixels, a select line connected to the charging circuit of each pixel of the row at a gate of the pixel-selecting transistor of that pixel;

wherein the common-voltage line, each data line, and each select line are connected to the drive componentry, and wherein the common-voltage line is connected to the charging circuit of each pixel of the array at the source and the gate of the capacitance-control transistor.

7. The display of claim 5, wherein each charging circuit further includes a permanent capacitor connected in parallel to the corresponding pixel.

8. The display of claim 7, wherein a size of the auxiliary electrode is such that the capacitance of the auxiliary capacitor is greater than the combined capacitance of the permanent capacitor and the pixel.

9. The display of claim 1, further comprising an amorphous silicon backplane.

10. The display of claim 9, wherein the capacitance-control transistor is configured to maintain the storage capacitance at the first level over the first frame-frequency range when a voltage on the amorphous silicon backplane is high; and wherein the capacitance-control transistor is configured to maintain the storage capacitance at the second level over the second frame-frequency range when the voltage on the amorphous silicon backplane is low.

11. An active matrix comprising:

an array of pixels individually addressable over a first frame-frequency range and over a second, higher frame-frequency range; and for each pixel of the array, a charging circuit through which that pixel is addressed, the charging circuit including an adjustable storage capacitance, the charging circuit configured such that the storage capacitance of each charging circuit is maintained at a first level over the first frame-frequency range, and at a second, lower level over the second frame-frequency range, wherein each adjacent pixel pair shares a capacitance-control line and a common-voltage line.

12. The active matrix of claim 11, further comprising an RGB color filter arrangement.

13. The active matrix of claim 11, further comprising an RGBW filter arrangement.

14. The active matrix of claim 11, wherein the array of pixels are arranged into groups of four square subpixels.

15. A method of driving a touch-sensitive display, the display including a touch sensor and an array of pixels individually addressable by drive componentry over a first frame-frequency range and over a second, higher frame-frequency range, and, for each pixel of the array, a charging circuit through which that pixel is addressed, the charging circuit including an adjustable storage capacitance, the method comprising:

maintaining the storage capacitance of each charging circuit at a first level over the first frame-frequency range;

maintaining the storage capacitance of each charging circuit at a second, lower level over the second frame-frequency range;

actively driving the display and not the touch sensor for a first frame duration over the first frame-frequency range; and actively driving the touch sensor and not the display for a second frame duration over the first-frame frequency range, the second duration not overlapping the first duration.

16. The method of claim 15, wherein the first frame duration is greater than the second frame duration.

17. The method of claim 15, wherein the first frame-frequency range includes frequencies of 1 to 7 Hz.

18. The method of claim 15, wherein the second frame-frequency range includes frequencies of 50 to 70 Hz.

19. The method of claim 15, wherein the second frame-frequency range includes frequencies of 120 and 240 Hz.

20. The method of claim 15, further comprising selecting between the first and second frame-frequency ranges based on a rate of change of a signal provided to the drive componentry.

* * * * *